United States Patent
Mattila

(10) Patent No.: US 9,501,856 B2
(45) Date of Patent: Nov. 22, 2016

(54) METHOD AND APPARATUS FOR GENERATING PANORAMIC MAPS WITH ELEMENTS OF SUBTLE MOVEMENT

(75) Inventor: Ville-Veikko Mattila, Tampere (FI)

(73) Assignee: Nokia Technologies Oy, Espoo (FI)

(*) Notice: Subject to any disclaimer, the term of this patent is extended or adjusted under 35 U.S.C. 154(b) by 797 days.

(21) Appl. No.: 13/371,708

(22) Filed: Feb. 13, 2012

(65) Prior Publication Data

US 2013/0207973 A1    Aug. 15, 2013

(51) Int. Cl.
| | | |
|---|---|---|
| *G06T 13/00* | (2011.01) | |
| *G06T 13/80* | (2011.01) | |
| G06T 13/40 | (2011.01) | |
| A63F 13/40 | (2014.01) | |
| G06T 13/20 | (2011.01) | |

(52) U.S. Cl.
CPC ............. *G06T 13/80* (2013.01); *A63F 13/10* (2013.01); *G06T 13/00* (2013.01); *G06T 13/20* (2013.01); *G06T 13/40* (2013.01)

(58) Field of Classification Search
CPC ....... G06T 13/40; G06T 13/00; G06T 13/80; G06T 13/20; A63F 13/10
USPC ....... 345/418, 473, 474, 633, 632, 427, 441, 345/426, 475, 428; 382/107, 154, 285, 276, 382/274, 190
See application file for complete search history.

(56) References Cited

U.S. PATENT DOCUMENTS

| | | | |
|---|---|---|---|
| 6,278,466 B1* | 8/2001 | Chen ............................. 345/473 |
| 6,337,708 B1* | 1/2002 | Furlan et al. .................... 348/36 |
| 6,624,846 B1* | 9/2003 | Lassiter ...................... 348/211.4 |
| 8,207,964 B1* | 6/2012 | Meadow et al. .............. 345/419 |
| 2001/0040671 A1* | 11/2001 | Metcalf ........................... 353/94 |
| 2001/0046330 A1* | 11/2001 | Shaffer ............. G06F 17/30256 382/284 |
| 2004/0036711 A1 | 2/2004 | Anderson |
| 2004/0125148 A1 | 7/2004 | Pea et al. |
| 2005/0027712 A1* | 2/2005 | Gargi ................ G06F 17/30274 |
| 2006/0117356 A1* | 6/2006 | Jojic et al. ....................... 725/88 |
| 2008/0024594 A1* | 1/2008 | Ritchey ........................... 348/36 |
| 2008/0049123 A1* | 2/2008 | Gloudemans et al. ........ 348/239 |
| 2008/0106594 A1* | 5/2008 | Thrun ............................. 348/39 |
| 2010/0122208 A1* | 5/2010 | Herr et al. ..................... 715/799 |
| 2010/0182324 A1 | 7/2010 | Ko et al. |

(Continued)

FOREIGN PATENT DOCUMENTS

| | | |
|---|---|---|
| EP | 2360645 A2 | 8/2011 |
| GB | 188901382 A | 0/1899 |

OTHER PUBLICATIONS

International Search Report for related International Patent Application No. PCT/FI2013/050119 dated Jun. 20, 2013, 4 pages.

(Continued)

*Primary Examiner* — Abderrahim Merouan
(74) *Attorney, Agent, or Firm* — Ditthavong & Steiner, P.C.

(57) ABSTRACT

An approach is provided for generating panoramic maps with elements of subtle movement. A media platform processes and/or facilitates a processing of one or more panoramic images to cause, at least in part, a segmentation of at least one object from the one or more panoramic images. A media platform then determines one or more animations associated with the at least one object. A media platform thereafter causes, at least in part, a rendering of the one or more panoramic images with the one or more animations substituting for, modifying, or a combination thereof the at least one object.

19 Claims, 8 Drawing Sheets

(56) References Cited

U.S. PATENT DOCUMENTS

| | | | |
|---|---|---|---|
| 2011/0096144 A1* | 4/2011 | Pea et al. | 348/36 |
| 2011/0176010 A1 | 7/2011 | Houjou et al. | |
| 2011/0270517 A1* | 11/2011 | Benedetti | G01C 21/20 701/533 |
| 2012/0293505 A1* | 11/2012 | Meadow et al. | 345/419 |
| 2013/0016123 A1* | 1/2013 | Skarulis | 345/633 |
| 2014/0375752 A1* | 12/2014 | Shoemake | G06F 3/011 348/14.07 |

OTHER PUBLICATIONS

Written Opinion for related International Patent Application No. PCT/FI2013/050119 dated Jun. 20, 2013, 8 pages.

J. Tompkin, et al., "Towards Moment Imagery: Automatic Cinemagraphs," in Proceedings 2011 Conference for Visual Media Production, Nov. 16-17, 2011, Washington, D.C. U.S.A., pp. 97-93 <DOI: 10.1109/CVMP.2011/16>.

Office Action for corresponding European Patent Application No. 13749804.4-1906, dated Mar. 22, 2016, 8 Pages.

* cited by examiner

1

METHOD AND APPARATUS FOR GENERATING PANORAMIC MAPS WITH ELEMENTS OF SUBTLE MOVEMENT

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, etc.) that have greatly increased in popularity, functionality, and content. Advanced navigation and mapping applications allow users to use location aware searches to explore panoramic views of places with their mobile devices (e.g., mobile phones) by combining proprietary street imagery, building models, and terrain data to create interactive panoramic street scenes that provide an end-to-end platform for mobile panoramic three-dimensional maps. However, panoramic maps provide a static view of places from the time of capture (e.g., people and cars appear "frozen"), which can reduce a user's sense of immersion due to the lack of live action. In contrast, cinemagraphs combine still imagery (e.g., a still photograph) and moving imagery (e.g., animations) to generate subtle movement within an image. Therefore service providers and device manufactures face significant technical challenges in providing a service that allows users to experience panoramic maps featuring small and surprising elements of movement.

SOME EXAMPLE EMBODIMENTS

Therefore, there is a need for an approach for generating panoramic maps with elements of subtle movement.

According to one embodiment, a method comprises processing and/or facilitating a processing of one or more panoramic images to cause, at least in part, a segmentation of at least one object from the one or more panoramic images. The method also comprises determining one or more animations associated with the at least one object. The method further comprises causing, at least in part, a rendering of the one or more panoramic images with the one or more animations substituting for, modifying, or a combination thereof the at least one object.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more panoramic images to cause, at least in part, a segmentation of at least one object from the one or more panoramic images. The apparatus is also caused to determine one or more animations associated with the at least one object. The apparatus is further caused to cause, at least in part, a rendering of the one or more panoramic images with the one or more animations substituting for, modifying, or a combination thereof the at least one object.

According to another embodiment, a computer-readable storage medium carries one or more sequences of one or more instructions which, when executed by one or more processors, cause, at least in part, an apparatus to process and/or facilitate a processing of one or more panoramic images to cause, at least in part, a segmentation of at least one object from the one or more panoramic images. The apparatus is also caused to determine one or more animations associated with the at least one object. The apparatus is further caused to cause, at least in part, a rendering of the one or more panoramic images with the one or more animations substituting for, modifying, or a combination thereof the at least one object.

According to another embodiment, an apparatus comprises means for processing and/or facilitating a processing of one or more panoramic images to cause, at least in part, a segmentation of at least one object from the one or more panoramic images. The apparatus also comprises means for determining one or more animations associated with the at least one object. The apparatus further comprises means for causing, at least in part, a rendering of the one or more panoramic images with the one or more animations substituting for, modifying, or a combination thereof the at least one object.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating panoramic maps with elements of subtle movement are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
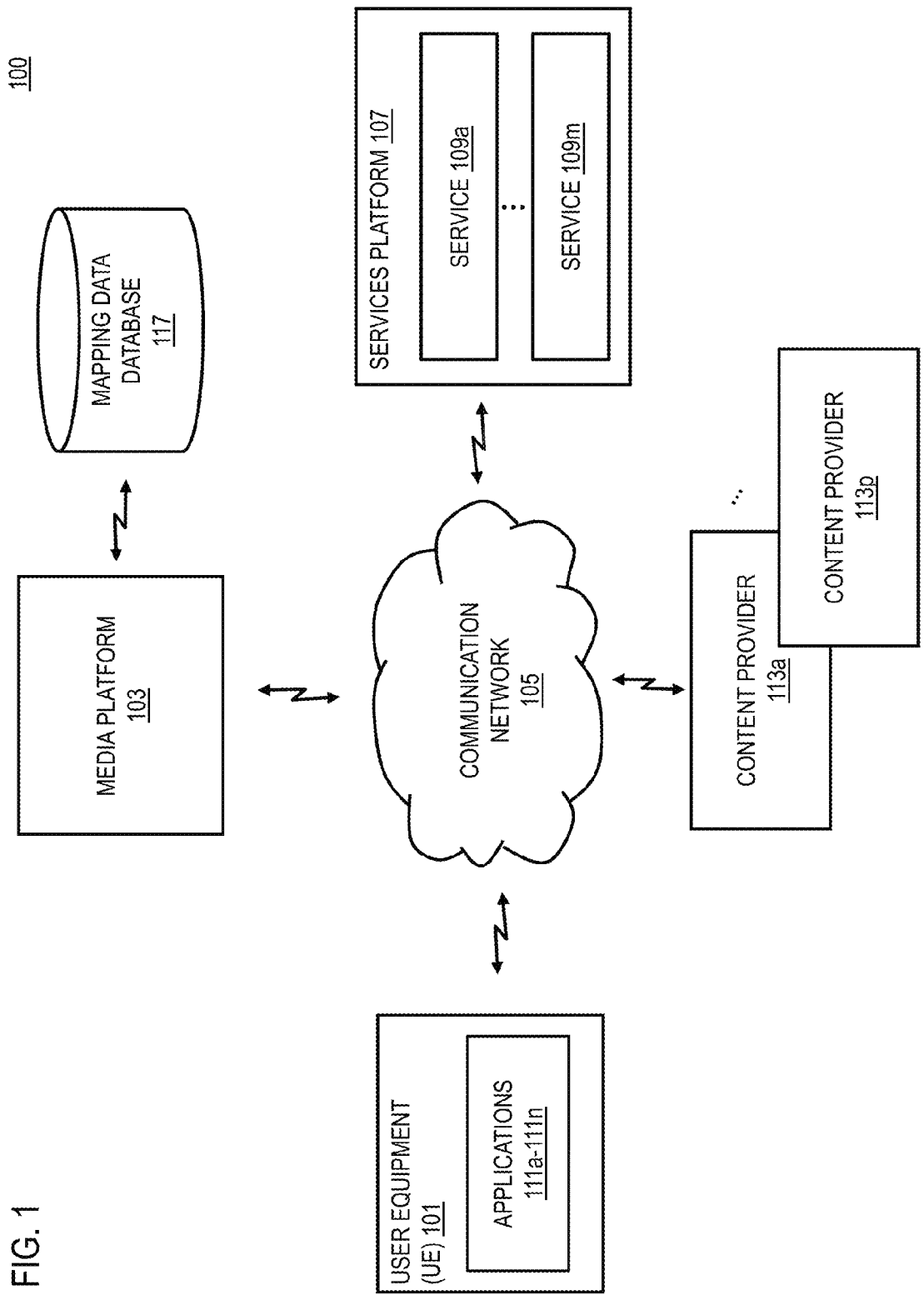
FIG. 1 is a diagram of a system capable of generating panoramic maps with elements of subtle movement, according to one embodiment.

FIG. 1 is a diagram of a system capable of generating panoramic maps with elements of subtle movement, according to one embodiment. As previously discussed, advanced navigation and mapping applications allow users to use location aware searches to explore panoramic views of places with their mobile devices (e.g., mobile phones) by combining proprietary street imagery, building models and terrain data to create interactive panoramic street scenes, providing an end-to-end platform for mobile panoramic three-dimensional maps. However, panoramic maps provide a static view of places from the time of capture (e.g., people and cars appear "frozen"), which can reduce a user's sense of immersion due to the lack of live action.

To address this problem, a system 100 of FIG. 1 introduces the capability to generate panoramic maps with elements of subtle movement. In one embodiment, the system 100 processes and/or facilitates a processing of one or more panoramic images (e.g., an image of downtown Chicago) in order to cause a segmentation of at least one object (e.g., a tree on a street or a window on a building façade) from the one or more panoramic images. More specifically, the system 100 segments the at least one object that has the potential to reflect and/or depict an element of motion (e.g., the branches or leaves of a tree). In an exemplary embodiment, the system 100 determines the segmentation of the at least one object based on one or more three-dimensional point clouds associated with one or more geographic regions depicted in the one or more panoramic images. By way of example, the one or more three-dimensional point clouds may be generated by using light detection and ranging (LiDAR) technologies and/or stereo-camera technologies. In one embodiment, the system 100 determines the segmentation of the at least one object based on an application of one or more image recognition technologies. The system 100 can also determine the segmentation of the at least one object based on one or more three-dimensional models and/or meshes (e.g., three-dimensional building models, terrain mesh data, etc.). In another embodiment, the system 100 can also determine the at least one object to segment from one or more panoramic images based on context information (e.g., a user profile, a browser history, etc.) associated with a device (e.g., a mobile phone) rendering the one or more panoramic images.

In one embodiment, once the system 100 determines the at least one object (e.g., a tree) to segment from one or more panoramic images, the system 100 then determines one or more animations to associate with the at least one object. In particular, the one or more panoramic images made available to the system 100 by one or more services, one or more content providers, or a combination thereof (e.g., NAVTEQ) comprise panoramic images taken sequentially (e.g., every four meters) of a place or a location. As a result, the at least one object is visible from several sequentially taken panoramic images that all can be used by the system 100 to generate one or more animations. More specifically, the one or more sequential panoramic images can be animated by the system 100 to provide an illusion of live objects in the panoramic scene. In one embodiment, the system 100 causes an extraction of one or more animation frames (e.g., key frames) of the at least one object from one or more sequences of the one or more panoramic images (e.g., adjacent panoramic images). The system 100 can then cause a creation of one or more animations as one or more cinemagraphs of the least one object based on the one or more animation frames. As previously discussed, a cinemagraph is a visual object that combines still imagery (e.g., a panoramic image) and moving imagery (e.g., animations) to generate subtle movement within the image. Whereas panoramic images provide a static view of places, cinemagraphs of segmented objects can add small elements of movement and surprising experiences of motion to still photographs. By way of example, the system 100 can cause a rendering of the at least one object in a loop to provide a user with the experience and/or illusion of continuous motion such that trees sway in the wind and/or reflections change on building windows in the one or more panoramic images.

In one embodiment, the system 100 causes a rendering of the one or more panoramic images (e.g., an image of downtown Chicago) with the one or more animations (e.g., a cinemagraph of a tree) substituting for the at least one object. In another embodiment, the system 100 modifies and/or enhances the at least one object by adding the one or more animations on top of the object (e.g., as a semitransparent layer) in order to generate elements of subtle movement. Moreover, in one embodiment, the system 100 can cause an association of the one or more animations to the one or more panoramic images, rendering data (e.g., metadata, location-based data, place of interest (POI) data, etc.) associated with the one or more panoramic images, or a combination thereof. In one embodiment, the system 100 can also cause a rendering of the one or more animations in the one or more panoramic images based on one or more predetermined themes, one or more user preferences, one or more temporal characteristics of the one or more panoramic images, or a combination thereof. In addition, the system 100 can determine to apply additional materials to the one or more animation frames of the at least one segmented object (e.g., a change of color, number, shape, etc. of the leaves of a tree) based on one or more predetermined themes, one or more user preferences, etc. In particular, the one or more additional materials may include user-created content. However, while there are a wide variety of potential animations that the system 100 can determine to apply to the one or more animation frames, the context (i.e., the time of the capture of the underlying objects) is important and the one or more animations should ultimately provide a user with an illusion of live objects in the panoramic scene.

In one embodiment, the system 100 also causes a caching of the one or more animations of the at least one object from the one or more panoramic images at a device (e.g., a mobile phone), a database, or a combination thereof. The system 100 can then render the cached one or more animations for one or more subsequent renderings of (a) the one or more panoramic images (b) one or more other panoramic images depicting the at least one object, one or more other objects that are at least substantially similar to the at least one object, or a combination thereof; or (c) a combination thereof. In addition, the system 100 can cause a caching, a retrieval, or a combination thereof of one or more other animations with one or more other panoramic images at least substantially adjacent to the one or more panoramic images. As a result, if a user navigates to a new and/or adjacent panoramic image (e.g., virtually moving down a street), part of the animation information associated with the at least one object can be re-used by the system 100 to quickly create one or more animations related to the adjacent panoramic image.

As shown in FIG. 1, the system 100 comprises a user equipment (UE) 101 having connectivity to a media platform 103 via a communication network 105. The UE 101 may include or be associated with one or more applications 111a-111n (e.g., mapping or navigation applications) (also collectively referred to as application 111). The system 100 also includes a services platform 107 that provides one or more services 109a-109m (also collectively referred to as the services 109) to components of the system 100. The services 109 may include a wide variety of services, such as content provisioning services that provision one or more panoramic three-dimensional maps (e.g., of downtown Chicago), one or more panoramic images, one or more building models, etc. The services 109 may also include navigation services, mapping services, social networking services, location-aware services, etc. The system 100 also includes content providers 113a-113p (also collectively referred to as content providers 113). The content providers 113 may provide content to the components of the system 100 (e.g., building models, terrain mesh, panoramic images, etc.).

In one embodiment, the media platform 103 may be associated with a mapping data database 117. The mapping data database 117 may include one or more building models, one or more terrain meshes, one or more panoramic images relating to one or more geographic locations and/or places. The mapping data database 117 may also include one or more animation frames of the at least one object (e.g., a tree), one or more animations and/or cinemagraphs (e.g., a tree swaying in the wind), one or more panoramic images with the one or more animations substituting for the at least one object, one or more panoramic images with the one or more animations added on top of the at least one object (e.g., as a semitransparent layer), rendering data associated with the one or more panoramic images (e.g., metadata, location-based data, POI data, etc.), or a combination thereof. The mapping data database 117 may exist in whole or in part within the media platform 103, or independently. In certain embodiments, the services 109 and/or the content providers 113 may have connectivity to the mapping data database 117 via the communication network 105.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the media platform 103 processes and/or facilitates a processing of one or more panoramic images (e.g., an image of downtown Chicago or New York) in order to cause a segmentation of at least one object (e.g., a tree on a street or a window on a building façade) from the one or more panoramic images. More specifically, the media platform 103 segments the at least one object (e.g., a tree) that has the potential to reflect and/or depict an element of motion (e.g., the branches or leaves of the tree). In an exemplary embodiment, the media platform 103 determines the segmentation of the at least one object based on LiDAR data associated with one or more geographic regions depicted in the one or more panoramic images. In one embodiment, the media platform 103 determines the segmentation of the at least one object based on an application of one or more image recognition technologies. The media platform 103 can also determine the segmentation of the at least one object based on one or more three-dimensional models and/or meshes (e.g., three-dimensional building models, terrain mesh data, etc.). In another embodiment, the media platform 103 can also determine the at least one object to segment from the one or more panoramic images based on context information (e.g., a user profile, a browser history, etc.) associated with a device rendering the one or more panoramic images (e.g., a mobile phone).

In one embodiment, once the media platform 103 determines the at least one object (e.g., a tree or window) to segment from one or more panoramic images, the media platform 103 then determines one or more animations to associate with the at least one object. In particular, the one or more panoramic images made available to the media platform 103 by one or more services, one or more content providers, or a combination thereof (e.g., NAVTEQ) comprise panoramic images of a location or a place taken sequentially (e.g., every four meters). As a result, the at least one object is visible from several sequentially taken panoramic images that all can be used by the media platform 103 to generate one or more animations. More specifically, the one or more sequential panoramic images can be animated by the media platform 103 to provide an illusion of live objects in the panoramic scene. In one embodiment, the media platform 103 causes an extraction of one or more animation frames (e.g., key frames) of the at least one object (e.g., a tree) from one or more sequences of the one or more panoramic images (e.g., adjacent panoramic images). The media platform 103 can then cause a creation of one or more animations as one or more cinemagraphs of the least one object based on the one or more animation frames. Whereas panoramic images provide a static view of places, cinemagraphs of segmented objects can add small elements of movement and surprising experiences of motion to still photographs. In one example, the media platform 103 can cause a rendering of the at least one object in a loop to provide a user with the experience and/or illusion of continuous motion such that trees sway in the wind or reflections change on building windows in one or more panoramic images.

In one embodiment, the media platform 103 causes a rendering of the one or more panoramic images (e.g., an image of downtown Chicago or New York) with the one or more animations (e.g., a cinemagraph of a tree) substituting for the at least one object. In another embodiment, the media platform 103 modifies and/or enhances the at least one object by adding the one or more animations on top of the object (e.g., as a semitransparent layer) in order to generate elements of subtle movement. Moreover, in one embodiment, the media platform 103 can cause an association of the one or more animations to the one or more panoramic images, rendering data (e.g., metadata, location-based data, POI data, etc.) associated with the one or more panoramic images, or a combination thereof. In one embodiment, the media platform 103 can also cause a rendering of the one or more animations in the one or more panoramic images based on one or more predetermined themes, one or more user preferences, one or more temporal characteristics of the one or more panoramic images, or a combination thereof. In addition, the media platform 103 can determine to apply additional material to the one or more animation frames of the at least one segmented object (e.g., a change in color, number, shape, etc. of the leaves of a tree) based on one or more predetermined themes, one or more user preferences, etc. In particular, the additional materials may include user-generated content. However, while there are a wide variety of potential animations that the media platform 103 can determine to apply to the one or more animation frames, it is contemplated that the one or more animations will preserve the context in which in the underlying object was captured (e.g., time, season, etc.) and ultimately provide a user with an illusion of live objects in the panoramic scene.

In one embodiment, the media platform 103 can further cause a caching of the one or more animation of the at least one object (e.g., a tree) from the one or more panoramic images at a UE 101 (e.g., a mobile phone), the mapping data database 117, or a combination thereof. The media platform can then render the cached one or more animations for one or more subsequent renderings of (a) the one or more panoramic images (b) one or more other panoramic images depicting the at least one object, one or more other objects that are at least substantially similar to the at least one object, or a combination thereof; or (c) or a combination thereof. In addition, the media platform 103 can cause a caching, a retrieval, or a combination thereof of one or more other animations with one or more other panoramic images at least substantially adjacent to the one or more panoramic images. As a result, if a user navigates to a new and/or adjacent panoramic image (e.g., virtually moving down the street), part of the animation information associated with the at least one object can be re-used by the media platform 103 to quickly create one or more animations related to the adjacent panoramic image.

By way of example, the UE 101, the media platform 103, the services platform 107, the content providers 113, and the mapping data database 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2)

header, an internetwork (layer 3) header and a transport (layer 4) header, and various application (layer 5, layer 6 and layer 7) headers as defined by the OSI Reference Model.

Figure 2:
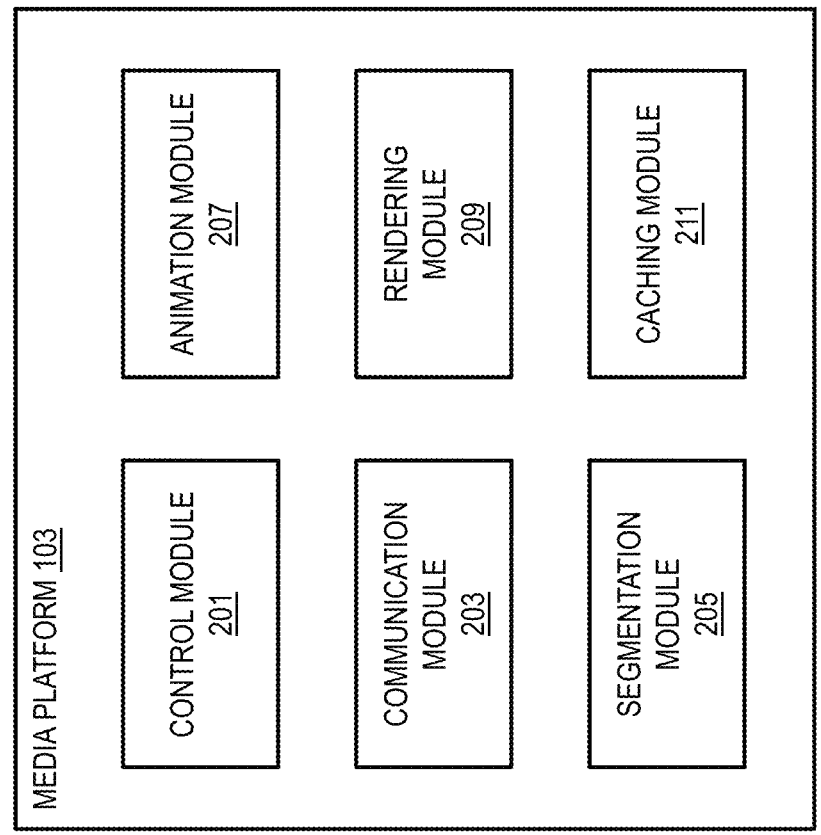
FIG. 2 is a diagram of the components of a media platform, according to one embodiment.

FIG. 2 is a diagram of the components of media platform 103, according to one embodiment. By way of example, the media platform 103 includes one or more components for generating panoramic maps with elements of subtle movement. It is contemplated that the functions of these components may be combined in one or more components or performed by other components of equivalent functionality. In this embodiment, the media platform 103 includes a control module 201, a communication module 203, a segmentation module 205, an animation module 207, a rendering module 209, and a caching module 211.

The control module 201 executes at least one algorithm for executing functions of the media platform 103. For example, the control module 201 may execute an algorithm for processing a query associated with a UE 101 for media (e.g., a panoramic map) related to a place (e.g., downtown Chicago). By way of another example, the control module 201 may execute an algorithm to interact with the communication module 203 to communicate among the media platform 103, the service platform 107, the content providers 113, and the mapping data database 117. The control module 201 may also execute an algorithm to interact with the segmentation module 205 to cause a segmentation of at least one object (e.g., a window of a building) from one or more panoramic images (e.g., a panoramic image of downtown Chicago). The control module 201 also may execute an algorithm to interact with the animation module 207 to determine one or more animations to associate with the at least one object (e.g., a cinemagraph). The control module 201 may also execute an algorithm to interact with the rendering module 209 to cause a rendering of the one or more panoramic images with the one or more animations substituting for the at least one object. In another embodiment, the control module 201 also may interact with the rendering module to modify and/or enhance the at least one object by adding the one or more animations on top of the object (e.g., as a semitransparent layer) in order to generate elements of subtle movement. The control module 201 may also execute an algorithm to interact with the caching module 211 to cause a caching of the one or more animations associated with the at least one object at a device (e.g., a mobile device), a database, or a combination thereof for use at a later period of time by the media platform 103, the device, or a combination thereof.

The communication module 203 is used for communication among the media platform 103, the service platform 107, the content providers 113, and the mapping data database 117. The communication module 203 may be used to communicate commands, requests, data, etc. By way of example, the communication module 203 may be used to determine a request from a UE 101 for one or more panoramic images (e.g., a panoramic three-dimensional map) related to a place (e.g., downtown Chicago). In one embodiment, the communication module 203 is used to cause an association of the one or more animations to the one or more panoramic images, rendering data associated with the one or more panoramic images (e.g., metadata, location-based data, POI data, etc.), or a combination thereof. In one embodiment, the communication module 203 is also used to cause a caching, a retrieval, or a combination thereof of one or more animations associated with one or more panoramic images at least substantially adjacent to the one or more panoramic images. By way of example, the one or more panoramic images are adjacent in the sense that one or more services, one or more content providers, or a combination thereof can sequentially capture (e.g., every four meters) the one or more panoramic images of a place.

The segmentation module 205 is used to process and/or facilitate a processing of the one or more panoramic images to cause a segmentation of at least one object (e.g., a tree) from the one or more panoramic images (e.g., an image of downtown Chicago). More specifically, the segmentation module 205 segments the at least one object that has the potential to reflect and/or depict an element of motion (e.g., the branches or leaves of a tree and/or the windows of a building). In an exemplary embodiment, the segmentation module 205 determines the segmentation of the at least one object based on LiDAR data associated with one or more geographic regions depicted in the one or more panoramic images. In one embodiment, the segmentation module 205 determines the segmentation of the at least one object based on an application of one or more image recognition technologies. The segmentation module 205 can also determine the segmentation of the least one object based on one or more three-dimensional models and/or meshes (e.g., three-dimensional building models, terrain mesh data, etc.). In another embodiment, the segmentation module 205 can also determine the at least one object to segment based on context information (e.g., a user profile, a browser history, etc.) associated with a device (e.g., a mobile phone) rendering the one or more panoramic images. In addition, the segmentation module 205 can also be used, in connection with the animation module 207, to extract one or more animation frames of the at least one object from one or more sequences of the one or more panoramic images.

The animation module 207 is used to determine one or more animations (e.g., a loop) to associate with the at least one object segmented from the one or more panoramic images by the segmentation module 205. As previously discussed, the one or more panoramic images made available to the segmentation module 205 and the animation module 207 by one or more services, one or more content providers, or a combination thereof (e.g., NAVTEQ) comprise panoramic images of a location or a place taken sequentially (e.g., every four meters). As a result, the at least one object is visible from several sequentially taken panoramic images that all can be used by the animation module 207 to generate one or more animations. More specifically, the one or more sequential panoramic images can be used by the animation module 207 to provide an illusion of live objects in the panoramic scene. In one embodiment, once the segmentation module 205 extracts one or more animation frames of the at least one object from one or more sequences of the one or more panoramic images (e.g., adjacent panoramic images), the animation module 207 can cause a creation of one or more animations as one or more cinemagraphs of the at least one objects based on the one or more animations frames.

The rendering module 209 is used to cause a rendering of the one or more panoramic images (e.g., an image of downtown Chicago) with the one or more animations (e.g., a cinemagraph of a tree or a window in a building) substituting for the at least one object. In another embodiment, the rendering module 209 may also be used to modify and/or enhance the at least one object by adding the one or more animations on top of the object (e.g., as a semitransparent layer) in order to generate elements of subtle movement. In one embodiment, the rendering module 209 can be used to cause a rendering of the one or more animations in the one or more panoramic images based on one or more predetermined themes, one or more user preferences, one or more temporal characteristics of the one or more panoramic, or a combination thereof. The rendering module 209, in connection with the caching module 211, is also user to render cached one or more animations for one or more subsequent renderings of (a) the one or more panoramic images; (b) one or more other panoramic images depicting the at least one object, one or more other objects that are substantially similar to the at least one object, or a combination thereof; or (c) a combination thereof. In addition, the rendering module 209 can be used to apply additional materials to the one or more animation frames of the at least one segmented object (e.g., a change of color, number, shape, etc. of the leaves of a tree) based on one or more predetermined themes, one or more user preferences, etc. In one example use case, the rendering module 209 can also be used to apply user-created content to the one or more animation frames.

The caching module 211 is used to cause a caching of the one or more animations of the at least one object (e.g., a tree) from one or more panoramic images at a device (e.g., a mobile phone), a database, or a combination thereof. The caching module 211, in connection with the communication module 203, is also used to cause a caching, a retrieval, or a combination thereof of one or more animations associated with one or more other panoramic images at least substantially adjacent to the one or more panoramic images. Thus, if a user navigates to a new and/or adjacent panoramic image (e.g., virtually moving down the street), part of the animation information associated with the at least one object can be re-used by the animation module 207 to quickly create one or more animations related to the adjacent panoramic image.

Figure 3:
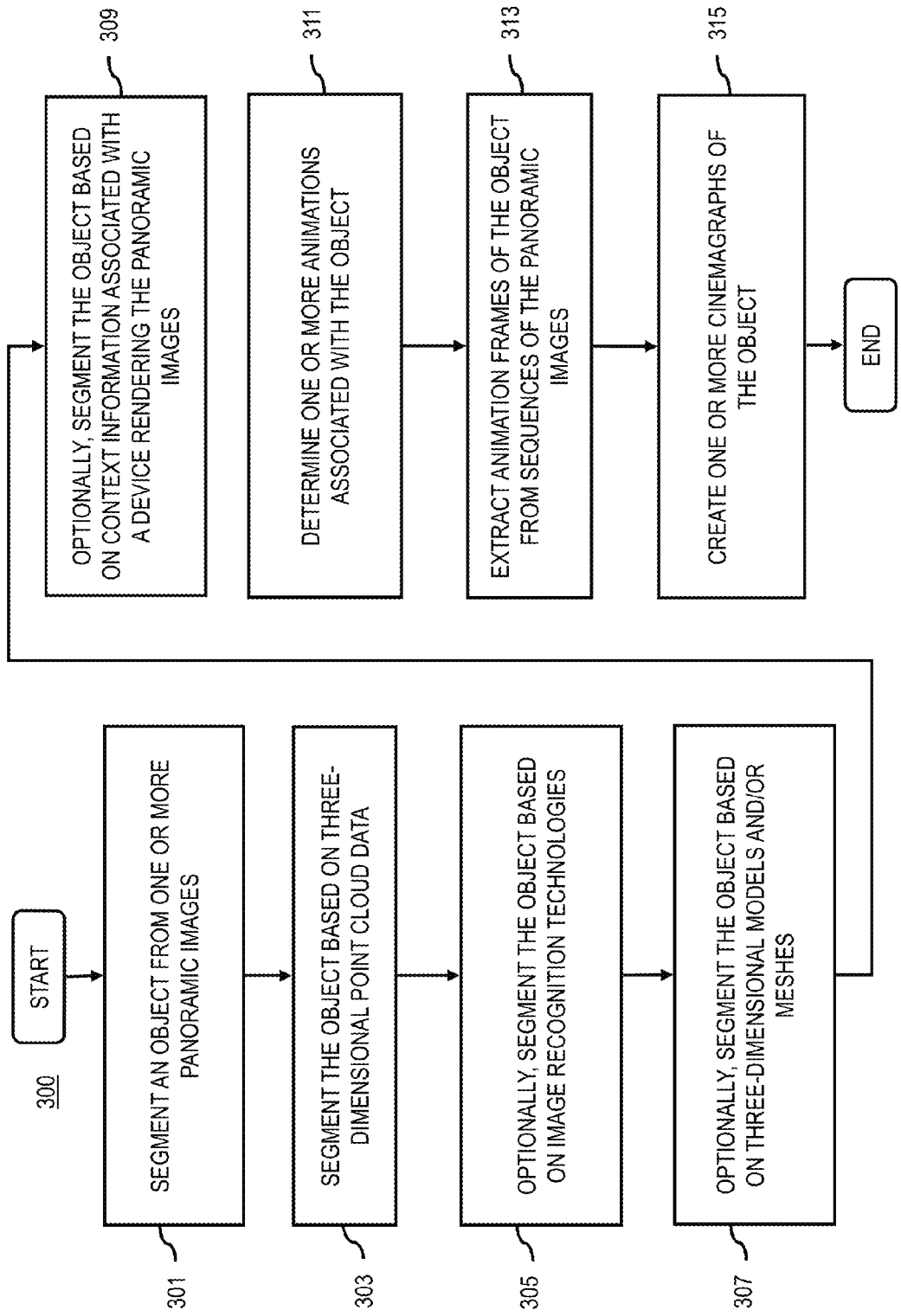
FIGS. 3 and 4 are flowcharts of processes for generating panoramic maps with elements of subtle movement, according to one embodiment.
Figure 4:
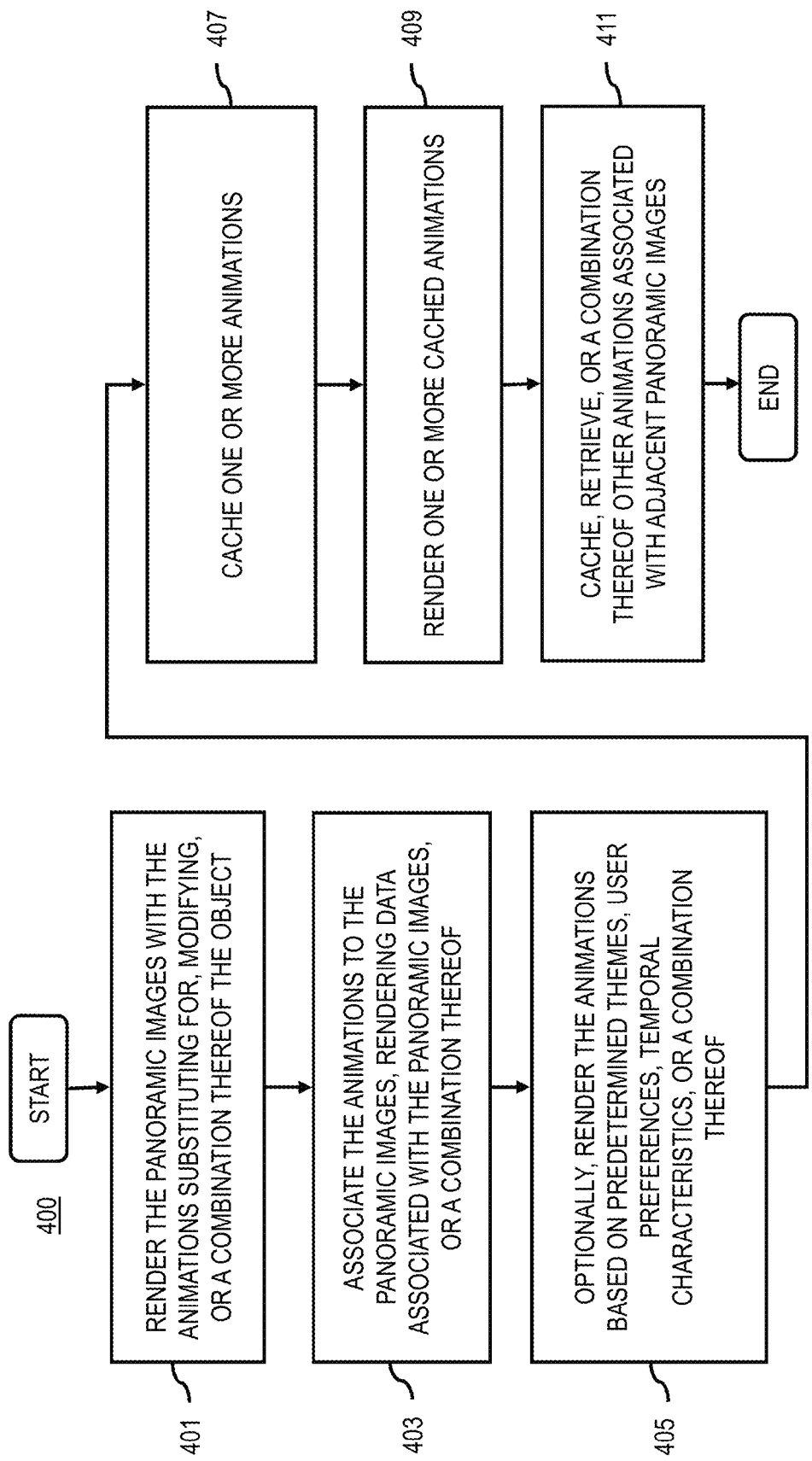
Figure 7:
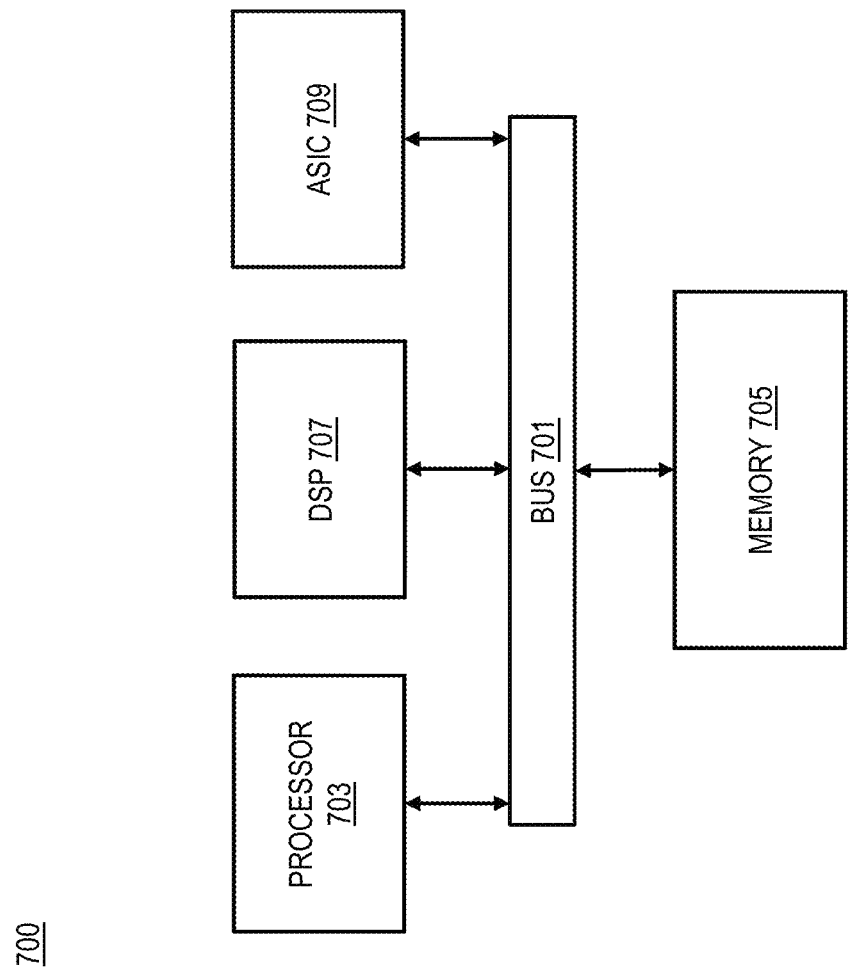
FIG. 7 is a diagram of a chip set that can be used to implement an embodiment of the invention.

FIGS. 3 and 4 are flowcharts of processes for generating panoramic maps with elements of subtle movement, according to one embodiment. FIG. 3 depicts a process 300 of segmenting and animating at least one object from one or more panoramic images. In one embodiment, the media platform 103 performs the process 300 and is implemented in, for instance, a chip set including a processor and a memory as shown in FIG. 7. In step 301, the media platform 103 processes and/or facilitates a processing of one or more panoramic images to cause, at least in part, a segmentation of at least one object from the one or more panoramic images. The media platform 103 segments the at least one object by separating the at least one object from the background of the one or more panoramic images. More specifically, the media platform 103 segments the at least one object from one or more objects that has the potential to reflect and/or depict an element of motion (e.g., trees on the streets and/or windows on building facades).

In step 303, the media platform 103 determines the segmentation of the at least one object based, at least in part, on one or more three-dimensional point clouds data associated with one or more geographic areas depicted in the one or more panoramic images. By way of example, the one or more three-dimensional point clouds may be generated by using LiDAR technologies and/or stereo-camera technologies. Moreover, the more accurate the media platform 103 can segment the at least one object from the one or more panoramic images, the better the media platform 103 can animate the at least one object (e.g., using cinemagraphic techniques). As a result, in an exemplary embodiment, the media platform 103 determines the segmentation of the at least one object based on LiDAR data whenever possible.

In step 305, the media platform 103 optionally determines the segmentation of the at least one object based, at least in part, on an application of one or more image recognition technologies to the one or more panoramic images. As previously discussed, the better the media platform 103 can segment the at least one object (e.g., a tree), the better the media platform 103 is able to animate the object. Therefore, in the event LiDAR data is unavailable for a particular geographic region depicted in one or more panoramic images, image recognition technologies may be used by the media platform 103 in order to separate the particular object from the background of the one or more panoramic images.

In step 307, the media platform 103 optionally determines the segmentation of the at least one object based, at least in part, on one or more three-dimensional models and/or meshes associated with one or more geographical areas depicted in the one or more panoramic images. More specifically, one or more services, one or more content providers, or a combination thereof (e.g., NAVTEQ) have previously measured and constructed three-dimensional building models and terrain meshes of one or more objects in one or more panoramic images that the media platform 103 can utilize to segment the at least one object. By way of example, a three-dimensional building model may be aligned with the panoramic image containing the same building by the media platform 103 in order to segment the one or more windows from the façade of the building.

In step 309, the media platform 103 optionally determines the at least one object to segment based, at least in part, on context information associated with a device rendering the one or more panoramic images. By way of example, the context information may include a user profile, a user history, a browsing history, etc. associated with a device (e.g., a mobile phone).

In step 311, the media platform 103 determines one or more animations associated with the at least one object. As previously discussed, panoramic maps provide a static view of places from the time of capture. More specifically, people and cars appear "frozen", which reduces the sense of immersion that a user may experience due to the lack of live action. In contrast, by determining to associate one or more animations with the one or more panoramic images, the media platform 103 can create an illusion of motion and/or provide a user with an illusion of live objects in the panoramic image.

In step 313, the media platform 103 causes, at least in part, an extraction of one or more animation frames of the at least one object from one or more sequences of the one or more panoramic images. As previously discussed, the one or more panoramic images made available to the media platform 103 by one or more services, one or more content providers, or a combination thereof (e.g., NAVTEQ) comprise panoramic images captured sequentially (e.g., ever four meters) of a place. By way of example, the media platform 103 can extract one or more animation frames (e.g., key frames) of the at least one object from the one or more sequences in order to determine the movement of the at least one object that a user will experience. As a result of the extraction of the one or more animation frames, the one or more sequential panoramic images can be animated by the media platform 103 to provide a user with an illusion of live objects in the panoramic scene.

In step 315, the media platform 103 causes, at least in part, a creation of one or more animations as one or more cinemagraphs of the at least one object based, at least in part, on the one or more animation frames. In contrast to still panoramic images, cinemagraphs combine still imagery (e.g., a photograph) and moving imagery (e.g., animations) to generate subtle movement within an image (i.e., an illusion of motion). In some instances, cinemagraphs can be considered as art. More specifically, the application of cinemagraphs to one or more panoramic images can add small elements of movement and surprising experiences of motion to still panoramic images. By way of example, trees can sway in the wind and reflections on building windows can move in one or more cinemagraphs of one of more panoramic images.

FIG. 4 depicts a process 400 of rendering and then optionally caching the one or more animations of at least one object from one or more panoramic images. In one embodiment, the media platform 103 performs the process 400 and is implemented in, for instance, a chip set including a processor and a memory as shown in FIG. 7. In step 401, the media platform 103 causes, at least in part, a rendering of the one or more panoramic images with the one or more animations substituting for, modifying, or a combination thereof the at least one object. As previously discussed, once the media platform 103 segments the at least one object from one or more panoramic images (i.e., separates the object from the background), the media platform 103 can substitute the one or more animations (e.g., a loop) for the at least one object and then render the one or more panoramic images at a device (e.g., a mobile phone) to present a user of the device with an illusion of motion relative to the at least one object (e.g., a tree swaying in the wind). In another embodiment, the media platform 103 modifies and/or enhances the at least one object, rather than substituting it, by adding the one or more animations on top of the at least one object (e.g., as a semitransparent layer) in order to generate the elements of subtle movement (e.g., a tree swaying in the wind).

In step 403, the media platform 103 causes, at least in part, an association of the one or more animations to the one or more panoramic images, rendering data associated with the one or more panoramic images, or a combination thereof. More specifically, the rending data associated with the one or more panoramic images can include metadata, location-based data, building models, POI data, etc. and can be made available to a client over-the-air (OTA) on an as needed basis. In addition, the rendering data can also include information about the one or more segmented regions in the one or more panoramic images and/or the at least one object segmented from one or more adjacent panoramic images.

In step 405, the media platform 103 optionally causes, at least in part, a rendering of the one or more animations in the one or more panoramic images based, at least in part, on one or more predetermined themes, one or more user preferences, one or more temporal characteristics of the one or more panoramic images, or a combination thereof. In particular, it is contemplated that the media platform 103 would not be used to render one or more animations of an object (e.g., a tree) taken out of context from the time at which the object was captured. By way of example, one or more animations taken out of context would include animating a tree in the daytime in one or more panoramic images representing the tree in the nighttime or animating the tree in the winter in one or more panoramic images representing the summer. In addition, the media platform 103 can determine to apply additional materials to the one or more animation frames of the at least one segmented object (e.g., a change of color, number, shape, etc. of the leaves of a tree) based on one or more predetermined themes, one or more user preferences, etc. In a further example use case, it is contemplated that the additional materials could also include user-created content.

In step 407, the media platform 103 optionally causes, at least in part, a caching of the one or more animations. In one embodiment, the one or more animations can be cached locally at a client, in a database, or a combination thereof to be re-used on the client when a user navigates to a new and/or adjacent panoramic image (e.g., virtually moving down the street). As a result, the media platform 103 can quickly generate one or more animations related to the adjacent panoramic image without having to first repeat the entire process.

In step 409, the media platform 103 optionally causes, at least in part, a rendering of the cached one or more animations for one or more subsequent renderings of (a) the one or more panoramic images; (b) one or more other panoramic images depicting the at least one object, one or more other objects that are at least substantially similar to the at least one object, or a combination thereof or (c) a combination thereof. As previously discussed, by caching one or more animations, the media platform 103 is able to quickly generate one or more animations related to one or more panoramic images, one or more objects, or a combination thereof without having to first repeat the entire process, saving both time and computational resources.

In step 411, the media platform 103 optionally causes, at least in part, a caching, a retrieval, or a combination thereof of one or more other animations associated with one or more other panoramic images at least substantially adjacent to the one or more panoramic images. As previously discussed, the one or more panoramic images made available to the media platform 103 by one or more services, one or more content providers, or a combination thereof (e.g., NAVTEQ) comprise panoramic images captured sequentially (e.g., every four meters) of a place. Therefore the media platform 103 is later able to save time and computation resources by caching, retrieving, or a combination thereof one or more animations associated with more than one panoramic image. This is particular useful when, for example, a user wants to navigate to a new and/or adjacent panoramic image (e.g., virtually move down a street).

Figure 5:
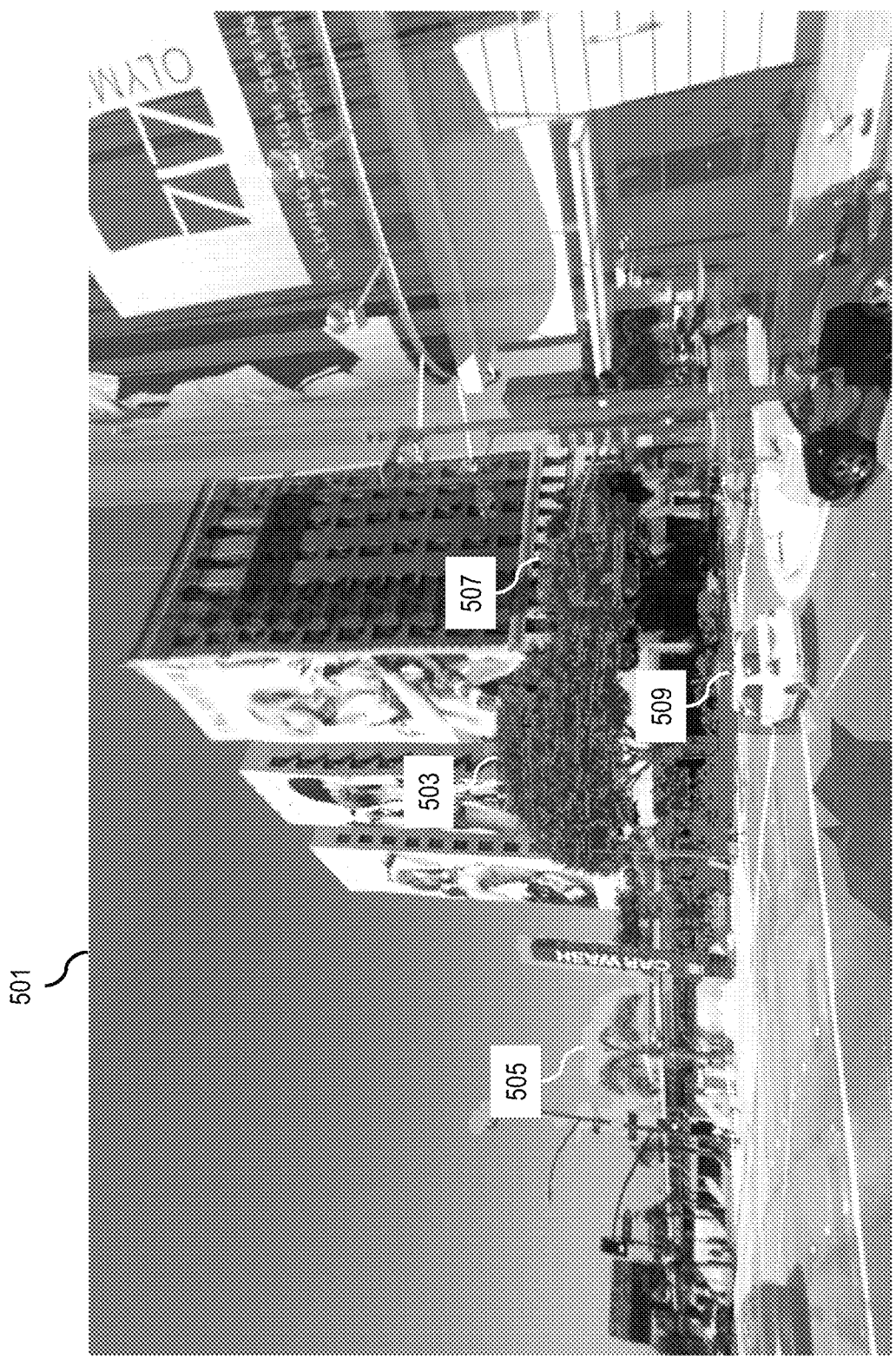
FIG. 5 is a diagram of an example panoramic image featuring a segmentation of at least one object, according to various embodiments.

FIG. 5 is a diagram of an example panoramic image featuring a segmentation of at least one object, according to various embodiments. As shown, FIG. 5 depicts an example panoramic image 501 featuring a segmentation of one or more objects (e.g., trees 503, 505, and 507 and a car 509). As previously discussed, the system 100 segments the trees 503, 505, and 507 and the car 509 from one or more objects in the panoramic image 501 because they have the potential to reflect and/or depict an element of motion. In an exemplary embodiment, the system 100 determines the segmentation of the trees 503, 505, and 507 and the car 509 based on LiDAR data associated with the objects as depicted in the panoramic image 501. By way of example, if LiDAR data is unavailable to segment the one or more objects, the system 100 can also determine the segmentation of the trees 503, 505, and 507 and/or the car 509 based on an application of one or more image recognition technologies. Once the system 100 determines to segment the trees 503, 505, and 507 and the car 509 from the panoramic image 501, the system 100 then determines one or more animations to associate with the one or more objects. In an exemplary embodiment, the system 100 creates one or more animations of the trees 503, 505, and 507 and the car 509 as one or more cinemagraphs based on one or more animation frames of the trees 503, 505, and 507 and the car 509 extracted by the system 100 from one or more sequences of the panoramic image 501 (e.g., one or more panoramic images captured sequentially every four meters). As previously discussed, a cinemagraph is a visual object that combines still imagery (e.g., panoramic image 501) and moving imagery (e.g., animations of the trees 503, 505, and 507 and the car 509) to generate subtle movement within the panoramic image

501. Whereas the panoramic image 501 provides a static view of the area depicted in the panoramic image 501, cinemagraphs of the trees 503, 505, and 507 and the car 509 substituted for the original trees 503, 505, and 507 and the car 509 can add small elements of movement and surprising experiences of motion to the panoramic image 501. By way of example, the system 100 can cause a rendering of the trees 503, 505, and 507 and the car 509 in the panoramic image 501 to provide a user with an experience and/or illusion of continuous motion such that the trees 503, 505, and 507 sway in the wind and the car 509 turns the corner of the street and then disappears behind the building in the foreground.

The processes described herein for generating panoramic maps with elements of subtle movement may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
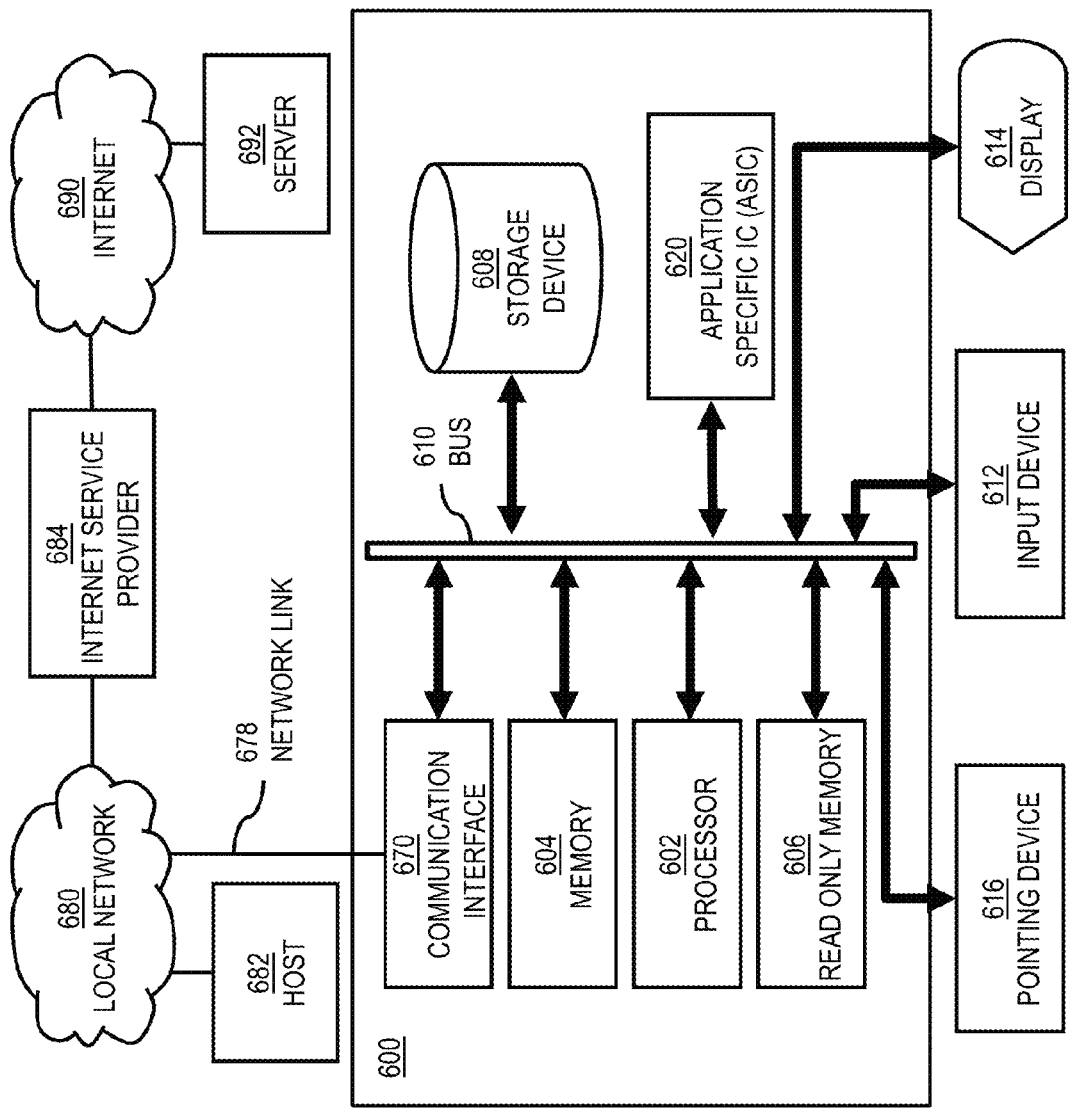
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate panoramic maps with elements of subtle movement as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating panoramic maps with elements of subtle movement.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate panoramic maps with elements of subtle movement. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating panoramic maps with elements of subtle movement. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating panoramic maps with elements of subtle movement, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating panoramic maps with elements of subtle movement to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate panoramic maps with elements of subtle movement as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating panoramic maps with elements of subtle movement.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate panoramic maps with elements of subtle movement. The memory 705 also stores the data associated with or generated by the execution of the inventive steps.

Figure 8:
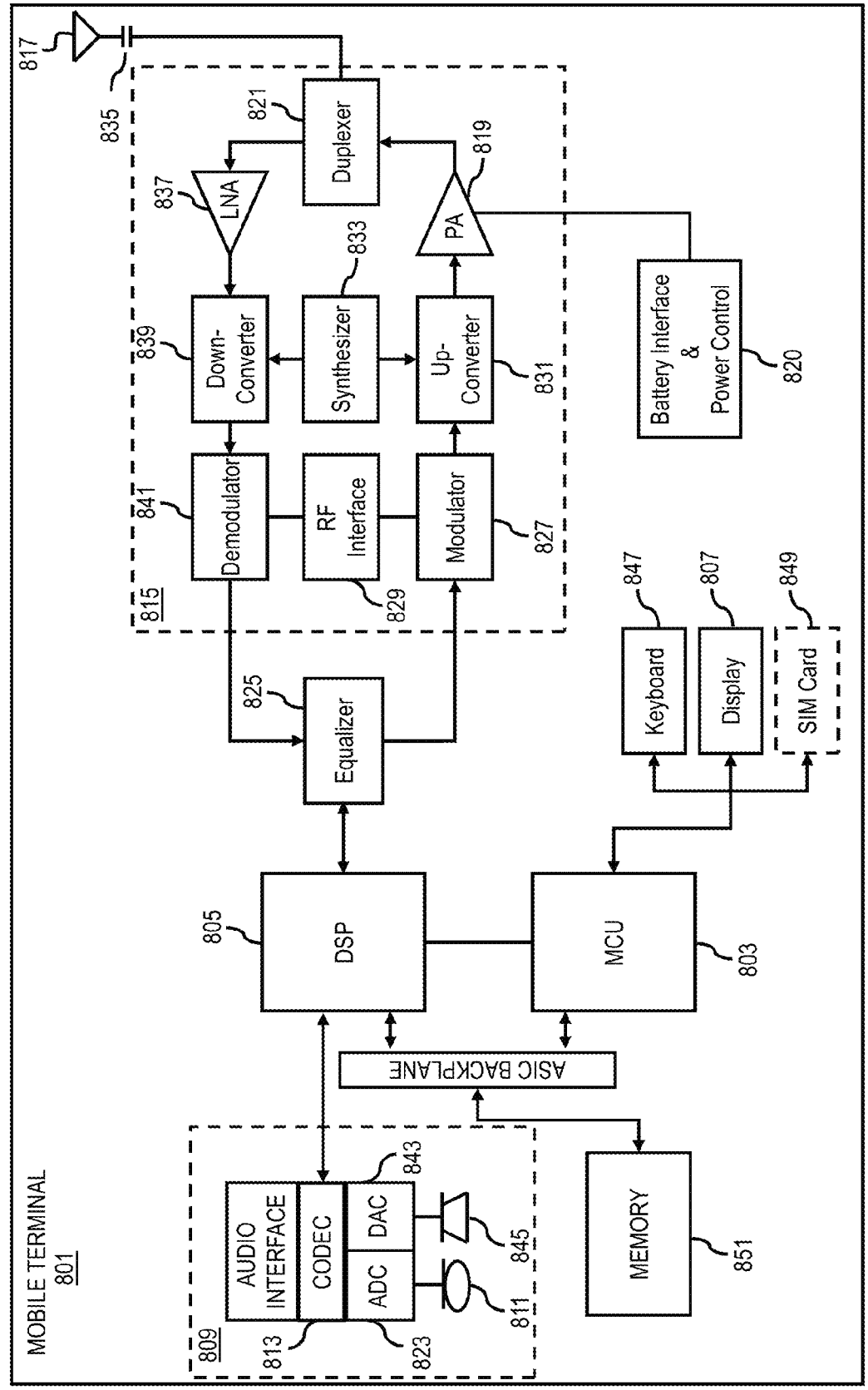
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating panoramic maps with elements of subtle movement. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating panoramic maps with elements of subtle movement. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate panoramic maps with elements of subtle movement. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a processing of one or more panoramic images to cause, at least in part, a segmentation of at least one object from the one or more panoramic images;
   at least one determination of the at least one object to segment based, at least in part, on a user's profile, a user's history, or a browser history associated with a device rendering the one or more panoramic images;
   at least one determination of one or more animations associated with the at least one object; and
   a rendering of the one or more panoramic images with the one or more animations substituting for, modifying, or a combination thereof the at least one object.

2. A method of claim 1, wherein the (1) data and/or (2) information and/or (3) at least one signal are further based, at least in part, on the following:
   an extraction of one or more animation frames of the at least one object from one or more sequences of the one or more panoramic images; and a creation of one or more animations as one or more cinemagraphs of the at least one object based, at least in part, on the one or more animation frames.

3. A method of claim 1, wherein the (1) data and/or (2) information and/or (3) at least one signal are further based, at least in part, on the following:
at least one determination of the segmentation of the at least one object based, at least in part, on one or more three-dimensional point clouds associated with one or more geographic areas depicted in the one or more panoramic images.

4. A method of claim 1, wherein the (1) data and/or (2) information and/or (3) at least one signal are further based, at least in part, on the following:
at least one determination of the segmentation of the at least one object based, at least in part, on an application of one or more image recognition technologies to the one or more panoramic images.

5. A method of claim 1, wherein the (1) data and/or (2) information and/or (3) at least one signal are further based, at least in part, on the following:
an association of the one or more animations to the one or more panoramic images, rendering data associated with the one or more panoramic images, or a combination thereof.

6. A method of claim 5, wherein the rending data associated with the one or more panoramic images is based, at least in part, on metadata, location-based data, building models, place of interest (POI) data, or a combination thereof.

7. A method of claim 1, wherein the (1) data and/or (2) information and/or (3) at least one signal are further based, at least in part, on the following:
a caching of the one or more animations; and
a rendering of the cached one or more animations for one or more subsequent renderings of (a) the one or more panoramic images; (b) one or more other panoramic images depicting the at least one object, one or more other objects that are at least substantially similar to the at least one object, or a combination thereof; or (c) a combination thereof.

8. A method of claim 1, wherein the (1) data and/or (2) information and/or (3) at least one signal are further based, at least in part, on the following:
a caching, a retrieval, or a combination thereof of one or more other animations associated with one or more other panoramic images at least substantially adjacent to the one or more panoramic images.

9. A method of claim 1, wherein the (1) data and/or (2) information and/or (3) at least one signal are further based, at least in part, on the following:
a rendering of the one or more animations in the one or more panoramic images based, at least in part, on one or more predetermined themes, one or more user preferences, one or more temporal characteristics of the one or more panoramic images, or a combination thereof.

10. A method of claim 9, wherein the (1) data and/or (2) information and/or (3) at least one signal are further based, at least in part, on the following:
at least one determination of the segmentation of the at least one object based, at least in part, on one or more three-dimensional models and/or meshes associated with one or more geographical areas depicted in the one or more panoramic images.

11. An apparatus comprising:
at least one processor; and
at least one memory including computer program code for one or more programs, the at least one memory and the computer program code configured to, with the at least one processor, cause the apparatus to perform at least the following,
process and/or facilitate a processing of one or more panoramic images to cause, at least in part, a segmentation of at least one object from the one or more panoramic images;
determine the at least one object to segment based, at least in part, on a user's profile, a user's history, or a browser history associated with a device rendering the one or more panoramic images;
determine one or more animations associated with the at least one object; and
cause, at least in part, a rendering of the one or more panoramic images with the one or more animations substituting for, modifying, or a combination thereof the at least one object.

12. An apparatus of claim 11, wherein the apparatus is further caused to:
cause, at least in part, an extraction of one or more animation frames of the at least one object from one or more sequences of the one or more panoramic images; and
cause, at least in part, a creation of one or more animations as one or more cinemagraphs of the at least one object based, at least in part, on the one or more animation frames.

13. An apparatus of claim 11, wherein the apparatus is further caused to:
determine the segmentation of the at least one object based, at least in part, on one or more three-dimensional point clouds associated with one or more geographic areas depicted in the one or more panoramic images.

14. An apparatus of claim 11, wherein the apparatus is further caused to:
determine the segmentation of the at least one object based, at least in part, on an application of one or more image recognition technologies to the one or more panoramic images.

15. An apparatus of claim 11, wherein the apparatus is further caused to:
cause, at least in part, an association of the one or more animations to the one or more panoramic images, rendering data associated with the one or more panoramic images, or a combination thereof.

16. An apparatus of claim 11, wherein the apparatus is further caused to:
cause, at least in part, a caching of the one or more animations; and
cause, at least in part, a rendering of the cached one or more animations for one or more subsequent renderings of (a) the one or more panoramic images; (b) one or more other panoramic images depicting the at least one object, one or more other objects that are at least substantially similar to the at least one object, or a combination thereof; or (c) a combination thereof.

17. An apparatus of claim 11, wherein the apparatus is further caused to:
cause, at least in part, a caching, a retrieval, or a combination thereof of one or more other animations associated with one or more other panoramic images at least substantially adjacent to the one or more panoramic images.

18. An apparatus of claim 11, wherein the apparatus is further caused to:
   cause, at least in part, a rendering of the one or more animations in the one or more panoramic images based, at least in part, on one or more predetermined themes, one or more user preferences, one or more temporal characteristics of the one or more panoramic images, or a combination thereof.

19. An apparatus of claim 18, wherein the apparatus is further caused to:
   determine the segmentation of the at least one object based, at least in part, on one or more three-dimensional models and/or meshes associated with one or more geographical areas depicted in the one or more panoramic images.

* * * * *